(12) United States Patent
Uchida et al.

(10) Patent No.: US 9,239,112 B2
(45) Date of Patent: Jan. 19, 2016

(54) METAL GASKET

(75) Inventors: Kenji Uchida, Toyota (JP); Toru Takasu, Toyota (JP); Kazuya Yoshijima, Toyota (JP)

(73) Assignees: NIPPON GASKET CO., LTD., Toyota-shi, Aichi (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 783 days.

(21) Appl. No.: 12/311,713

(22) PCT Filed: Dec. 27, 2007

(86) PCT No.: PCT/JP2007/075163
§ 371 (c)(1),
(2), (4) Date: Apr. 9, 2009

(87) PCT Pub. No.: WO2008/084718
PCT Pub. Date: Jul. 17, 2008

(65) Prior Publication Data
US 2010/0025940 A1    Feb. 4, 2010

(30) Foreign Application Priority Data
Jan. 12, 2007   (JP) .................................. 2007-004564

(51) Int. Cl.
*F16J 15/08*   (2006.01)

(52) U.S. Cl.
CPC ........ *F16J 15/0825* (2013.01); *F16J 2015/085* (2013.01); *F16J 2015/0862* (2013.01); *F16J 2015/0868* (2013.01); *F16J 2015/0875* (2013.01)

(58) Field of Classification Search
CPC .............. F16J 15/0825; F16J 2015/085; F16J 15/0818; F16J 2015/0837; F16J 2015/0843; F16J 2015/0875
USPC .................................................. 277/592–595
See application file for complete search history.

(56) References Cited

U.S. PATENT DOCUMENTS

| 5,205,566 | A | * | 4/1993 | Ueta et al. | 277/596 |
| 5,551,709 | A | * | 9/1996 | Plunkett | 277/592 |
| 6,148,516 | A | * | 11/2000 | Diez et al. | 29/888.3 |
| 6,827,352 | B2 | * | 12/2004 | Ueta et al. | 277/593 |
| 6,951,338 | B2 | * | 10/2005 | Kestly | 277/593 |
| 8,646,783 | B2 | * | 2/2014 | Fritz | 277/593 |
| 2002/0180161 | A1 | * | 12/2002 | Werz et al. | 277/594 |

FOREIGN PATENT DOCUMENTS

JP   07-035855     7/1995
JP   10-061771 A   3/1998
(Continued)

*Primary Examiner* — Shane Bomar
*Assistant Examiner* — Kipp Wallace
(74) *Attorney, Agent, or Firm* — Flynn, Thiel, Boutell & Tanis, P.C.

(57) ABSTRACT

A metal gasket 10 includes a pair of bead plates 14 and 14 having a cylinder hole 12 corresponding to a cylinder bore, a full bead 22 surrounding the cylinder hole, a first intermediate plate 18 interposed between the pair of bead plates, and a shim plate 16 interposed between the first intermediate plate and one bead plate in an area around the cylinder hole. The shim plate 16 is disposed to overlap with the full bead 22, and the thickness of a contact portion 19 to contact with the shim plate 16 of the first intermediate plate changes in the peripheral direction of the cylinder hole.

14 Claims, 2 Drawing Sheets

(56) References Cited

FOREIGN PATENT DOCUMENTS

| JP | 11-201285 | 7/1999 |
| JP | 2000-220746 A | 8/2000 |
| JP | 2002-156041 | 5/2002 |
| JP | 2004-503731 | 2/2004 |
| JP | 2004-286213 | 10/2004 |
| JP | 2005-036777 A | 2/2005 |
| WO | WO 02/070886 | 9/2002 |

* cited by examiner

METAL GASKET

TECHNICAL FIELD

The present invention relates to a metal gasket applied between facing surfaces of a cylinder head and a cylinder block of an engine.

BACKGROUND ART

Heretofore, there has been known a metal gasket which is interposed between joint surfaces of a cylinder block and a cylinder head to fasten the cylinder block and the cylinder head by a fastening bolt so as to seal the joint surfaces. It is known that when this kind of metal gasket is interposed between the cylinder head and the cylinder block to fasten them by the fastening bolt, a fastening load of the position adjacent to the bolt hole into which the fastening bolt is inserted enlarges, and the fastening load of the position away from the bolt hole lessens, that is, the fastening load around the cylinder hole becomes nonuniform.

To solve such a problem, heretofore, a metal gasket has been proposed, in which a pair of bead plates having a cylinder hole corresponding to a cylinder bore and a full bead surrounding the cylinder hole, an intermediate plate interposed between this pair of bead plates, and a shim plate interposed between one bead plate and the intermediate plate inside the full bead are provided, and the thickness of a contact portion to contact the shim plate in the intermediate plate is set thin at the position adjacent to the bolt hole into which the fastening bolt is inserted, and is set thick at the position away from the bolt hole (Patent Document 1).

According to the above described metal gasket, since the thickness of the contact portion at the position adjacent to the bolt hole whose fastening load increases is made thin, the fastening load of that portion can be made small, whereas the thickness of the contact portion at the position away from the bolt hole whose fastening load decreases is made thick, and therefore, the fastening load of that portion can be made large. Consequently, if the thickness of the contact portion is changed so as to be most appropriate, the fastening load around the cylinder hole can be made uniform.

Patent Document 1: Japanese Patent Application Laid-Open No. H11-201285

However, in the conventional metal gasket disclosed in the Patent Document 1, since a shim plate is provided inside a full bead, effective utilization of the elasticity of the full bead has been interfered by a thickness portion of the shim plate as a result. In other words, if the shim plate is not provided, the full bead can utilize the whole area of the height of the full bead as an elastic area, but if the shim plate is provided, the full bead has the elastic area reduced by the thickness portion of the shim plate, and consequently, effective utilization of the elasticity of the full bead is interfered by a thickness portion of the shim plate. As a result, a follow-up performance to head amplitude at the time of combustion is lowered, thereby bringing about a lowering of sealability.

The present invention has been made in view of the above described problem, and an object of the invention is to provide a metal gasket capable of enhancing the sealability by effectively utilizing the elasticity of the full bead, and eliminating the fluctuation of fastening load distribution around the cylinder hole to suppress the local concentration of the fastening load, thereby to enhance durability by suppressing damages of the full bead and the shim plate in the metal gasket applied by interposing into joint surfaces with a cylinder block and a cylinder head.

SUMMARY OF THE INVENTION

An aspect is a metal gasket interposed between joint surfaces of a cylinder block and a cylinder head to fasten the cylinder block and the cylinder head by a fastening bolt so as to seal the joint surfaces, and is characterized by including a pair of bead plates having a cylinder hole corresponding to a cylinder bore and a full bead surrounding the cylinder hole, a first intermediate plate interposed between the pair of bead plates, and a shim plate interposed between the first intermediate plate and one bead plate in an area around the cylinder hole, wherein the shim plate is disposed to overlap with the full bead and, at the same time, the thickness of a contact portion contacting the shim plate of the first intermediate plate is changed in the peripheral direction of the cylinder hole.

The aspect disposes the shim plate overlapping on the full bead and, therefore, a problem of interference with the effective utilization of the elasticity of the full bead by a thickness portion of the shim plate does not occur as it does conventionally. Consequently, the lowering of the follow-up performance to the head amplitude at the time of combustion is prevented, thereby enabling the sealability to be enhanced.

Further, since the shim plate is disposed to overlap with the full bead, the width of the shim plate can be made wider, as compared with the case where the shim plate is disposed inside the full bead. Consequently, a contact pressure applied on the shim plate is lowered so as to be able to suppress damaging the shim plate, thereby enabling the durability to be enhanced and, at the same time, by setting the thickness of the shim plate to an appropriate thickness, the full bead can be pressed against the cylinder block and the cylinder head with best suited elasticity.

In addition to this, since the thickness of the contact portion to contact the shim plate of the first intermediate plate is changed in the peripheral direction of the cylinder hole, the pressure contact force in the peripheral direction to the cylinder block and the cylinder head of the full bead can be adjusted at an appropriate position to become the best suited pressure contact force. Consequently, a seal leakage from the full bead in the portion where the pressure contact force is short and the damages of the full bead due to the excessive pressure contact force can be prevented, thereby a stable sealing operation can be obtained over a long period.

DESCRIPTION OF SYMBOLS

10 . . . METAL GASKET
12 . . . CYLINDER HOLE
13 . . . BOLT HOLE
14, 24, 28 . . . BEAD PLATE

16 ... SHIM PLATE
18 ... FIRST INTERMEDIATE PLATE
19 ... CONTACT PORTION
20 ... SECOND INTERMEDIATE PLATE
22, 26, 30 ... FULL BEAD

DETAILED DESCRIPTION OF THE INVENTION

A first embodiment of the present invention will be described below with reference to the drawings.

Figure 1:
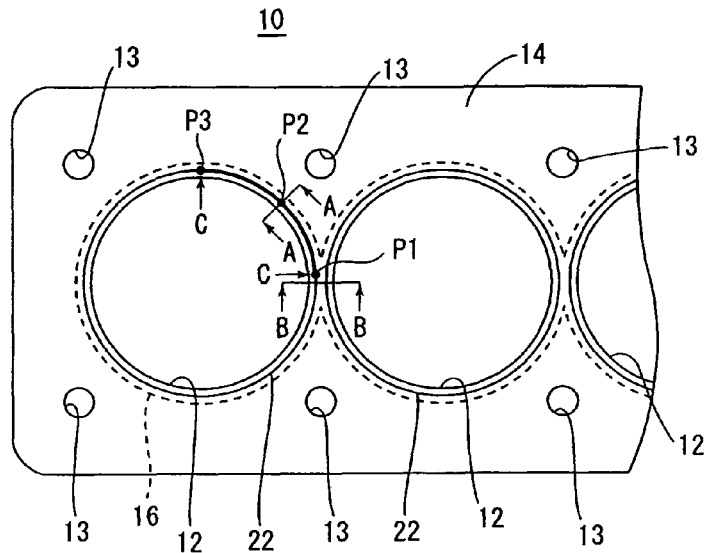
FIG. 1 is a top plan view of a metal gasket according to a first embodiment of the present invention.
Figure 2:
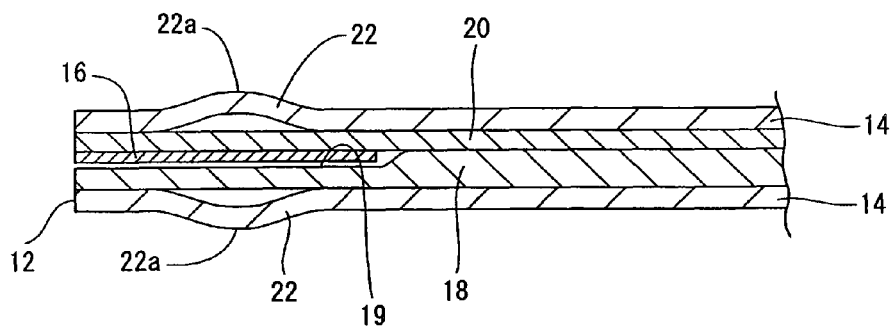
FIG. 2 is a sectional view cut along the line A-A of FIG. 1.
Figure 3:
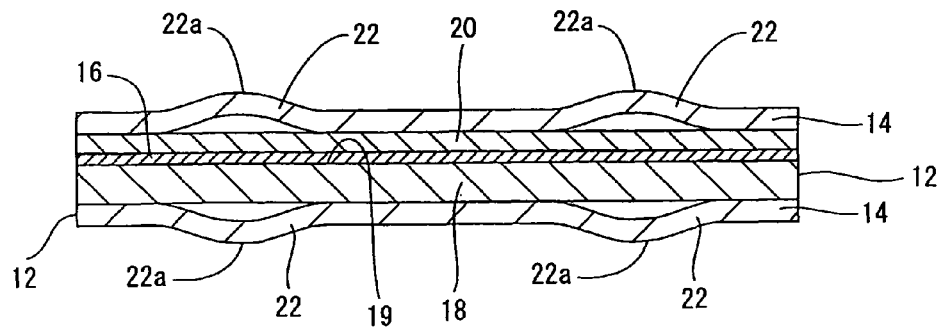
FIG. 3 is a sectional view cut along the line B-B of FIG. 1.
Figure 4:
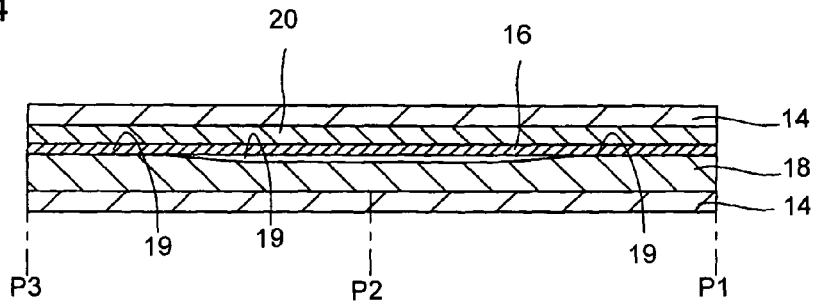
FIG. 4 is a sectional view cut along the line C-C of FIG. 1.

FIG. 1 is a top plan view of a metal gasket 10 according to the first embodiment of the present invention, and FIG. 2 is a sectional view cut along the line A-A of FIG. 1, FIG. 3 is a sectional view cut along the line B-B of FIG. 1, and FIG. 4 is a sectional view cut along the line C-C of FIG. 1.

The metal gasket 10 according to the first embodiment of the present invention, for example, is interposed between joint surfaces of an unillustrated cylinder block and cylinder head in a four cylinder engine to seal the joint surfaces, and has a cylinder hole 12 corresponding to a cylinder bore of the engine and a bolt hole 13 into which a fastening bolt for fastening the cylinder head and the cylinder block is inserted.

The metal gasket 10 includes a pair of bead plates 14 and 14, a shim plate 16 interposed there between, a first intermediate plate 18, and a second intermediate plate 20.

The pair of bead plates 14 and 14 disposed above and below the metal gasket 10 has a shape substantially conforming to the joint surfaces of the cylinder block and cylinder head, respectively. Each bead plate 14 is formed to a prescribed shape by punching out a plate material of approximately 0.2 mm to 0.25 mm in thickness composed of, for example, SUS301, SUS304, and the like, and is coated with a heat-resisting rubber and the like.

Each of the bead plates 14 and 14 is formed with full beads 22 surrounding each cylinder hole 12 in an endless state, respectively, and each full bead 22 is formed to project to the outside of the metal gasket 10, respectively.

The shim plate 16 is formed circularly by punching out a plate material of approximately 0.05 mm to 0.15 mm in thickness composed of, for example, SUS301, SUS304, and the like, and is interposed between the pair of bead plates 14 and 14 in the area around the cylinder hole 12.

This shim plate 16 is circular-shaped to extend into the area sandwiched by the full beads 22 and 22 formed in the pair of upper and lower bead plates 14 and 14 from an end edge portion of the cylinder hole 12, respectively, thereby both of the full beads 22 and 22 are disposed to overlap with the shim plate 16.

Each of the shim plates 16 surrounding each cylinder hole 12 is mutually connected in one body at the portion between the adjacent cylinder holes 12.

The first intermediate plate 18 is formed in the same shape as the bead plate 14 by punching out a steel plate of approximately 0.2 mm to 1.0 mm in thickness composed of, for example, SECC and the like, and is interposed between one bead plate 14 and the shim plate 16, and the thickness of a contact portion 19 to contact the shim plate 16 changes in the peripheral direction of the cylinder hole 12.

In the present embodiment, the contact portion 19 of the first intermediate plate 18 has a position P2 adjacent to the bolt hole 13 shown in FIG. 2 formed thinnest, and the positions P1 and P3 away from the bolt hole 13 between the cylinder bores shown in FIG. 3 formed thickest, and the thickness formed so as to continuously change in the peripheral direction of the cylinder hole 12 (See FIG. 4).

This variation of the thickness, that is, a difference of the thickest position between the cylinder bores and the thinnest position adjacent to the bolt hole 13 can be set within a range of, for example, approximately 5 μm to 50 μm. Further, a plain surface on which the contact portion 19 of the first intermediate plate 18 is formed may be coated with a rubber material such as a heat-resisting rubber.

The second intermediate plate 20 is a steel plate having a constant thickness of approximately 0.1 mm to 0.3 mm in thickness composed of, for example, SUS301, SUS304, and the like, and is formed in the same shape as the bead plate 14.

This second intermediate plate 20 is interposed between the bead plate 14 opposite to the first intermediate plate 18 and the shim plate 16, and the shim plate 16 is fixed to a prescribed position of this second intermediate plate 20 by welding and the like. This welding prefers that each constituent element be located in the full bead 22 in an integrated state, that is, located at the inner side of a crest portion 22a. Thereby, the unevenness occurring in the shim plate 16 by the welding does not adversely affect the surface of the metal gasket 10.

The pair of bead plates 14 and 14, and the first intermediate plate 18 and the second intermediate plate 20 interposed therebetween are mutually connected in one body by an unillustrated coupling means such as caulking. Consequently, the shim plate 16 fixed to the second intermediate plate 20 is also fixed to them in a positioned state.

As described above, in the metal gasket 10 according to the present embodiment, since the shim plate 16 is disposed to overlap with the full beads 22 and 22, there occurs no problem that the effective utilization of the elasticity of the full beads 22 and 22 is interfered by a thickness portion of the shim plate 16 similarly to the case where the shim plate 16 is disposed inside the full beads 22 and 22 without the shim plate 16 and the full beads 22 and 22 overlapping with each other.

Consequently, the whole area of the height of the full beads 22 and 22 can be utilized as an elastic area, thereby the improvement of the sealability can be achieved by enhancing the follow-up performance to the head amplitude at the time of combustion.

Further, since the shim plate 16 is disposed to overlap with the full beads 22 and 22, the width of the shim plate 16 can be set widely as compared with the case where the shim plate 16 is disposed inside side by side to the full beads.

Consequently, the contact pressure applied on the shim plate 16 is lowered so as to be able to suppress the damages to the shim plate 16, so that the durability thereof can be enhanced. Further, by setting the thickness of the shim plate 16 to an appropriate thickness, the full beads 22 and 22 can be pressed against the cylinder block and the cylinder head by most suitable elasticity.

Further, the thickness of the contact portion 19 to contact the shim plate 16 of the first intermediate plate 18 is made to change in the peripheral direction of the cylinder hole 12, and the position P2 adjacent to the bolt hole 13 is set thinnest, and the positions P1 and P3 away from the bolt hole 13 are set thickest, so that the pressure contact force in the peripheral direction toward the cylinder block and the cylinder head of the full beads 22 and 22 can be adjusted to become substantially uniform.

Consequently, a seal leakage from the full beads 22 and 22 in the portion where the pressure contact force is short and the damages of the full beads 22 and 22 due to the excessive pressure contact force can be prevented, so that a stable sealing operation can be obtained over a long period.

Since the contact portion 19 whose thickness in the first intermediate plate 18 changes is provided with a pair of full beads 22 and the shim plate 16 so as to overlap thereon, the fastening load of the fastening bolt is easily concentrated, and consequently, the fastening load for the change of the thickness can be easily adjusted, and therefore, the fastening load can easily be made uniform.

Figure 5:
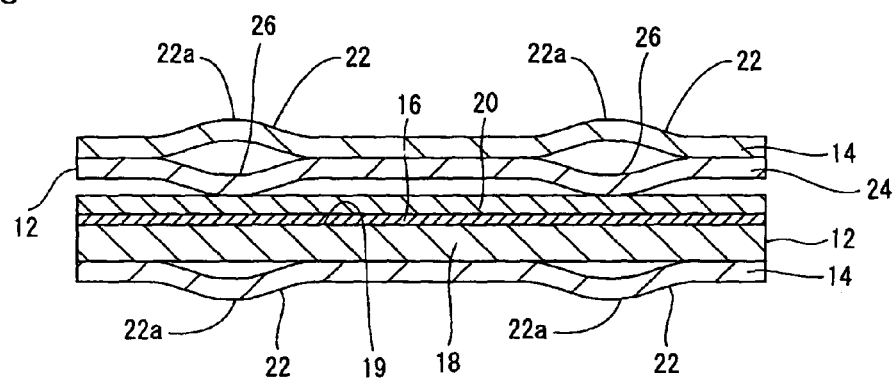
FIG. 5 is a sectional view of the metal gasket according to a second embodiment of the present invention.

FIG. 5 shows a second embodiment of the present invention, and in this embodiment, a third bead plate 24 is added between the upper bead plate 14 and the second intermediate plate 20 in the first embodiment.

This third bead plate 24 also, similarly to the bead plate 14, has a shape substantially conforming to the joint surfaces of the cylinder block and the cylinder head, and is formed to the prescribed shape by punching out the plate material of approximately 0.2 mm to 0.25 mm in thickness composed of, for example, SUS301, SUS304, and the like, and is coated with a heat-resisting rubber and the like.

The third bead plate 24 is formed with full beads 26 surrounding each of the cylinder holes 12 in an endless state, respectively, and each full bead 26 is formed to project to the inner side of the metal gasket 10 opposite to the projecting direction of the full bead 22 at the position overlapping with the full bead 22 formed on the upper bead plate 14, respectively.

Other configurations are the same as that of the first embodiment, and the same component portions are shown attached with the same reference numbers.

In the second embodiment also, the same effect as that of the first embodiment can be obtained. Particularly, in the second embodiment, since the contact portion 19 whose thickness in the first intermediate plate 18 changes is provided with three full beads 22, 22, and 24 and the shim plate 16 so as to be overlapped therewith, the elastic area can be expanded by a height portion of a full bead 24 of the third bead plate 24 as compared with the first embodiment, and consequently, the follow-up performance to the head amplitude at the time of combustion can be enhanced much more.

As a modified example of the second embodiment, instead of providing the third bead plate 24 between the upper bead plate 14 and second intermediate plate 20, the third bead plate 24 may be provided between the lower bead plate 14 and the first intermediate plate 18. In this case, the projecting direction of the full bead 26 of the third bead plate 24 may be set opposite to that of FIG. 5.

Figure 6:
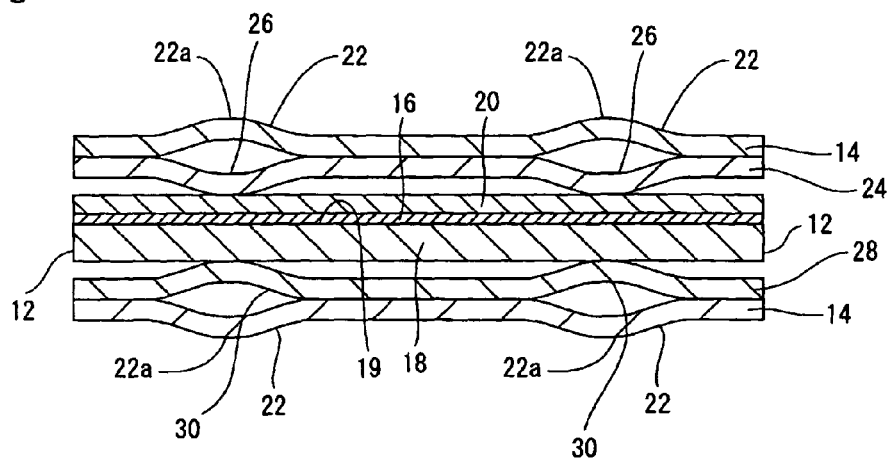
FIG. 6 is a section view of the metal gasket according to a third embodiment of the present invention.

FIG. 6 shows a third embodiment of the present invention, and in this embodiment, a fourth bead plate 28 is further added between the lower bead plate 14 and the first intermediate plate 18 in the second embodiment.

This fourth bead plate 24 also, similarly to the bead plate 14 and 26, has a shape substantially conforming to the joint surfaces of the cylinder block and the cylinder head, and is formed to the prescribed shape by punching out the plate material of approximately 0.2 mm to 0.25 mm in thickness composed of, for example, SUS301, SUS304, and the like, and is coated with a heat-resisting rubber and the like.

The fourth bead plate 28 is formed with full beads 30 surrounding each of the cylinder holes 12 in an endless state, respectively, and each of the full beads 30 is formed to be projected to the inner side of the metal gasket 10 opposite to the projecting direction of the full bead 22 at the position overlapped with the full bead 22 formed on the lower bead plate 14, respectively.

Other configurations are the same as that of the second embodiment, and the same component portions are shown attached with the same reference numbers.

In the third embodiment also, the same effect as that of the first embodiment can be obtained. Particularly, in a fourth embodiment, since the contact portion 19 whose thickness in the first intermediate plate 18 changes is provided with four full beads 22, 22, 24, and 30 and the shim plate 16 so as to be overlapped therewith, the elastic area can be expanded by a height portion of the full bead 24 of the third bead plate 24 and a height portion of the full bead 30 of the fourth bead plate 28, as compared with the first embodiment, and consequently, the follow-up performance to the head amplitude at the time of combustion can be enhanced much more.

In the first to third embodiments, the positions P1 and P3 away from the bolt hole 13 are formed thickest, respectively. That is, the position P1 sandwiched by each of the cylinder holes 12 and 12 is a position away from the bolt hole 13, and a midway position P3 of the two bolt holes 13 and 13 is also a position away from the bolt hole 13. Hence, the thickness of the contact portion 19 at each of the positions P1 and P3 is set thickest.

However, the present invention is not limited to this. For example, when the positions P1 and P3 are compared, since the position P1 sandwiched by each of the cylinder holes 12 and 12 is more easily to leak the combustion gas than the position P3 which becomes the midway position of the two bolt holes 13 and 13, the thickness of the contact portion 19 in the position P1 sandwiched by each of the cylinder holes 12 and 12 may be set thickest as compared with the other portions.

More specifically, the thickness only of the contact portion 19 which becomes the position P1 away from the bolt hole 13 sandwiched by each of the cylinder holes 12 and 12 is set thickest, and the thickness of the contact portion 19 in the position P3 away from other bolt holes 13 can be set thinner than the thickness of the position P1, and moreover, can be set thicker than the thickness of the contact portion 19 in the position P2 adjacent to the bolt hole 13.

Further, depending on the engine, the thickness only of the contact portion 19 which becomes the position P1 away from the bolt hole 13 sandwiched by each of the cylinder holes 12 and 12 is set thickest, and the thickness of the contact portion 19 in the position P3 away from other bolt holes 13 may be set conformed to the thickness of the contact portion 19 in the position P2 adjacent to the bolt hole 13.

The invention claimed is:

1. A metal gasket interposed between joint surfaces of a cylinder block and a cylinder head to fasten said cylinder block to said cylinder head by a fastening bolt so as to seal the joint surfaces, characterized by comprising:

a first bead plate having a first cylinder hole corresponding to a cylinder bore and a first full bead surrounding the first cylinder hole;

a second bead plate having a second cylinder hole corresponding to the cylinder bore and a second full bead surrounding the second cylinder hole;

a first intermediate plate interposed between the first and second bead plates; and a shim plate interposed between the first intermediate plate and one of the first and second bead plates in an area around its cylinder hole;

wherein said shim plate is disposed to overlap with said first and second full beads, a plate thickness of a contact portion of said first intermediate plate contacting said shim plate varies in the circumferential direction of the cylinder hole, the plate thickness of said contact portion is thicker at a position away from the bolt hole than at a position adjacent to the bolt hole and the plate thickness in a cylinder axis direction of the contact portion varies in the circumferential direction of the cylinder hole and a first side of the first intermediate plate is a planar surface and the thickness of the first intermediate plate varies by means of a depression on an opposite side thereof.

2. The metal gasket according to claim 1, characterized in that a second intermediate plate is provided at an opposite side of the shim plate to the first intermediate plate by sandwiching said shim plate and said shim plate is fixed to the second intermediate plate.

3. The metal gasket according to claim 1, characterized in that said shim plate is fixed to the second intermediate plate by welding and the welding position is located in said first and second full beads.

4. The metal gasket according to claim 1, characterized in that a third bead plate having a third full bead projecting in a direction opposite to one of said first and second full beads at a position overlapping the first and second full beads is interposed between said first intermediate plate and the bead plate having said one of the first and second full beads.

5. The metal gasket according to claim 1, characterized in that a third bead plate having a third full bead projecting in a direction opposite to one of said first and second full beads at a position overlapping the first and second full beads is interposed between said second intermediate plate and the bead plate having said one of the first and second full beads.

6. The metal gasket according to claim 1, characterized in that a third bead plate having a third full bead projecting in a direction opposite to one of said first and second full beads at a position overlapping the first and second full beads is interposed between said second intermediate plate and the bead plate having said one of the first and second full beads and a fourth bead plate having a fourth bead projecting in a direction opposite to the other of said one of said first and second full beads at a position overlapping the first, second and third full beads is interposed between said first intermediate plate and the bead plate having the other of said one of said first and second full beads.

7. The metal gasket according to claim 1, characterized in that a dimensional difference between a position with a large plate thickness and a position with a small plate thickness in the contact portion of the first intermediate plate is 5 to 50 µm.

8. A metal gasket interposed between joint surfaces of a cylinder block and a cylinder head to fasten said cylinder block to said cylinder head by a fastening bolt so as to seal the joint surfaces, characterized by comprising:
a first bead plate having a first cylinder hole corresponding to a cylinder bore and a first full bead surrounding the first cylinder hole;
a second bead plate having a second cylinder hole corresponding to the cylinder bore and a second full bead surrounding the second cylinder hole;
a first intermediate plate interposed between the first and second bead plates; and
a shim plate interposed between the first intermediate plate and one of the first and second bead plates in an area around its cylinder hole;
wherein said shim plate is disposed to overlap with said first and second full beads, a plate thickness of a contact portion of said first intermediate plate contacting said shim plate varies in the circumferential direction of the cylinder hole, the plate thickness of said contact portion is thicker at a position sandwiched by an adjacent cylinder hole than at another position and the plate thickness in a cylinder axis direction of the contact portion varies in the circumferential direction of the cylinder hole and a first side of the first intermediate plate is a planar surface and the thickness of the first intermediate plate varies by means of a depression on an opposite side thereof.

9. The metal gasket according to claim 8, characterized in that a second intermediate plate is provided at an opposite side of the shim plate to the first intermediate plate by sandwiching said shim plate and said shim plate is fixed to the second intermediate plate.

10. The metal gasket according to claim 8, characterized in that said shim plate is fixed to the second intermediate plate by welding and the welding position is located in said first and second full beads.

11. The metal gasket according to claim 8, characterized in that a third bead plate having a third full bead projecting in a direction opposite to one of said first and second full beads at a position overlapping the first and second full beads is interposed between said first intermediate plate and the bead plate having said one of the first and second full beads.

12. The metal gasket according to claim 8, characterized in that a third bead plate having a third full bead projecting in a direction opposite to one of said first and second full beads at a position overlapping the first and second full beads is interposed between said second intermediate plate and the bead plate having said one of the first and second full beads.

13. The metal gasket according to claim 8, characterized in that a third bead plate having a third full bead projecting in a direction opposite to one of said first and second full beads at a position overlapping the first and second full beads is interposed between said second intermediate plate and the bead plate having said one of the first and second full beads and a fourth bead plate having a fourth bead projecting in a direction opposite to the other of said one of said first and second full beads at a position overlapping the first, second and third full beads is interposed between said first intermediate plate and the bead plate having the other of said one of said first and second full beads.

14. The metal gasket according to claim 8, characterized in that a dimensional difference between a position with a large plate thickness and a position with a small plate thickness in the contact portion of the first intermediate plate is 5 to 50 µm.

\* \* \* \* \*